United States Patent
El Defrawy et al.

(10) Patent No.: US 10,423,961 B1
(45) Date of Patent: Sep. 24, 2019

(54) SYSTEM AND METHOD FOR OPERATING A PROACTIVE DIGITAL CURRENCY LEDGER

(71) Applicant: HRL Laboratories, LLC, Malibu, CA (US)

(72) Inventors: Karim El Defrawy, Santa Monica, CA (US); Joshua D. Lampkins, Gardena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 820 days.

(21) Appl. No.: 14/626,561

(22) Filed: Feb. 19, 2015

Related U.S. Application Data

(60) Provisional application No. 61/941,843, filed on Feb. 19, 2014.

(51) Int. Cl.
  *G06Q 20/40* (2012.01)
  *G06Q 20/38* (2012.01)
  *G06Q 20/06* (2012.01)
  *G06Q 20/08* (2012.01)

(52) U.S. Cl.
  CPC ....... *G06Q 20/4016* (2013.01); *G06Q 20/065* (2013.01); *G06Q 20/08* (2013.01); *G06Q 20/3829* (2013.01)

(58) Field of Classification Search
  None
  See application file for complete search history.

(56) References Cited

U.S. PATENT DOCUMENTS

| 9,489,522 B1 * | 11/2016 | El Defrawy | .......... H04L 9/3218 |
| 2009/0070263 A1 * | 3/2009 | Davis | ...................... G06Q 20/10 705/44 |

(Continued)

FOREIGN PATENT DOCUMENTS

WO   WO-2014089225 A1 *   6/2014   ............. G06Q 20/10

OTHER PUBLICATIONS

Ivan Damgard, Y. I. (Jun. 24, 2013). Eprint. Retrieved from Eprint. iacr.org: https://eprint.iacr.org/2010/106.pdf (Year: 2013).*

(Continued)

*Primary Examiner* — Mamon Obeid
*Assistant Examiner* — El Mehdi Oussir
(74) *Attorney, Agent, or Firm* — Tope-McKay & Associates

(57) ABSTRACT

Described is a proactive digital currency (PDC) system and method. In an embodiment, the PDC system operates using a plurality of ledger servers. Thereafter, the user can use a secret sharing protocol to transfer coins amongst users of the PDC system. In doing so, the system receives, at the plurality of collectively operated ledger servers, a first address of the first user, a second address of the second user, and a secret share of each bit in a binary representation of the transaction value. The secret share conceals the transaction amount. The ledger servers verify that the transaction value will not overdraw a balance ledger associated with the first address of the first user. The transaction value and a transaction fee are subtracted from the first address of the first user, with the transaction value being added to the second address of the second user.

19 Claims, 3 Drawing Sheets

(56) References Cited

U.S. PATENT DOCUMENTS

| | | | | |
|---|---|---|---|---|
| 2012/0221421 | A1* | 8/2012 | Hammad | G06Q 10/00 705/16 |
| 2012/0239556 | A1* | 9/2012 | Magruder | G06Q 20/381 705/39 |
| 2013/0179337 | A1* | 7/2013 | Ochynski | G06Q 40/02 705/40 |
| 2013/0262302 | A1* | 10/2013 | Lettow | G06Q 20/027 705/41 |
| 2013/0346223 | A1* | 12/2013 | Prabhu | G06Q 20/20 705/17 |
| 2013/0346309 | A1* | 12/2013 | Giori | G06Q 20/0655 705/43 |
| 2014/0039901 | A1* | 2/2014 | Mosko | H04M 11/066 704/500 |
| 2014/0156512 | A1* | 6/2014 | Rahman | G06Q 20/10 705/39 |
| 2014/0279403 | A1* | 9/2014 | Baird | G06Q 20/322 705/38 |
| 2015/0033301 | A1* | 1/2015 | Pianese | H04L 63/083 726/5 |
| 2015/0046337 | A1* | 2/2015 | Hu | G06O 20/0658 705/65 |
| 2015/0178693 | A1* | 6/2015 | Solis | G06Q 30/06 705/30 |
| 2015/0324789 | A1* | 11/2015 | Dvorak | G06Q 20/3823 705/67 |
| 2015/0332256 | A1* | 11/2015 | Minor | G06Q 20/3678 705/69 |
| 2016/0234532 | A1* | 8/2016 | Lee | H04N 21/2381 |

OTHER PUBLICATIONS

Damgard et al. (Perfectly Secure Multiparty Computation and the Computational Overhead of Cryptography), Published in: Proceeding EUROCRYPT'10 Proceedings of the 29th Annual international conference on Theory and Applications of Cryptographic Techniques, pp. 445-565 (2010). (Year: 2010).*

Elwyn R. Berlekamp, "Algebraic Coding Theory," Aegean Park Press, 1984, Chapter 7.

Simon Barber, et al., "Bitter to better—how to make bitcoin a better currency," In Financial Cryptography, pp. 399-414, 2012.

Peter Bogetoft, et al., "Secure multiparty computation goes live," In Financial Cryptography, pp. 325-343, 2009.

Joshua Baron, et al., "How to withstand mobile virus attacks, revisited," Cryptology ePrint Archive, Report 2013/529, 2013. http://eprint.iacr.org/.

Ernest F. Brickell, et al., "Trustee-based tracing extensions to anonymous cash and the making of anonymous change," In SODA, pp. 457-466, 1996.

David Chaum, et al., "Untraceable electronic cash," In CRYPTO, pp. 319-327, 1988.

David Chaum, "Blind signatures for untraceable payments," In CRYPTO, pp. 199-203, 1982.

Jan Camenisch, Susan Hohenberger, and Anna Lysyanskaya, "Compact e-cash," In Ronald Cramer, editor, Advances in Cryptology EUROCRYPT 2005, vol. 3494 of Lecture Notes in Computer Science, pp. 302-321. Springer, Berlin Heidelberg, 2005.

Jan Camenisch, et al., "Balancing accountability and privacy using e-cash (extended abstract)," In Roberto Prisco and Moti Yung, editors, Security and Cryptography for Networks, vol. 4116 of Lecture Notes in Computer Science, pp. 141-155. Springer Berlin Heidelberg, 2006.

J. Camenisch, et al., "Endorsed e-cash." In Security and Privacy, 2007. SP '07. IEEE Symposium on, pp. 101-115, 2007.

Jan Camenisch, et al., "Digital payment systems with passive anonymity-revoking trustees," Journal of Computer Security, 5(1), pp. 69-90, 1997.

Jan Camenisch, et al., "An ecient fair payment system," In ACM Conference on Computer and Communications Security, pp. 88-94, 1996.

Ivan Damgard, et al., "Unconditionally secure constantrounds multiparty computation for equality, comparison, bits and exponentiation," In TCC, pp. 285-304, 2006.

Ivan Damgard and Jesper Buus Nielsen, "Scalable and unconditionally secure multiparty computation," In CRYPTO, pp. 572-590, 2007.

Matthew K. Franklin and Moti Yung, "Communication complexity of secure computation (extended abstract)," In STOC, pp. 699-710, 1992.

Amir Herzberg, et al., "Proactive secret sharing or: How to cope with perpetual leakage," In CRYPTO, pp. 339-352, 1995.

Jonathan Katz, et al., "Universally composable synchronous computation," In TCC, pp. 477-498, 2013.

Steven H. Low, et al., "Anonymous credit cards and their collusion analysis," IEEE/ACM Trans. Netw., 4(6), pp. 809-816, 1996.

Anna Lysyanskaya and Zulkar Ramzan, "Group blind digital signatures: A scalable solution to electronic cash," InFinancial Cryptography, pp. 184-197, 1998.

Robert McMillan, "$1.2m hack shows why you should never store bitcoins on the internet," 2013. http://www.wired.com/wiredenterprise/2013/11/inputs/.

Sarah Meiklejohn, et al., "A stful of bitcoins: Characterizing payments among men with no names," IMC, 2013.

Satoshi Nakamoto, "Bitcoin: A peer-to-peer electronic cash system," 2008, http://bitcoin.org/bitcoin.pdf.

Rafail Ostrovsky and Moti Yung, "How to withstand mobile virus attacks (extended abstract)," In PODC, pp. 51-59, 1991.

David Schultz, "Mobile Proactive Secret Sharing," PhD thesis, Massachusetts Institute of Technology, 2007.

Adi Shamir, "How to share a secret," Commun. ACM, 22(11), pp. 612-613, 1979.

Markus Stadler, "Fair blind signatures," In EUROCRYPT, pp. 209-219, 1995.

* cited by examiner

SYSTEM AND METHOD FOR OPERATING A PROACTIVE DIGITAL CURRENCY LEDGER

CROSS-REFERENCE TO RELATED APPLICATIONS

The present application is a non-provisional patent application, claiming the benefit of priority of U.S. Provisional Application No. 61/941,843, filed on Feb. 19, 2014, entitled, "Proactive Digital Currency (PDC)."

BACKGROUND OF THE INVENTION

(1) Field of Invention

The present invention relates to digital currency and, more particularly, to a digital currency system that uses generic secure multiparty computation (MPC) protocols to keep a secret-shared ledger among a group of servers to provide a semicentralized digital currency.

(2) Description of Related Art

The present invention relates to the field of digital currency. Currently, there are a large number of both proposed and deployed digital currency schemes, such as those described in the following references as cited in the List of Cited Literature References [Cha82, CFN88, CHL05, CHL06, CLM07, Nak08] (to name only a few). Most current schemes are either centralized or completely distributed in a peer-to-peer fashion. The completely decentralized nature of digital currencies, such as Bitcoin, prevents oversight and regulation from being effectively implemented. If bitcoins are used to sell illegal goods, there is no way for law enforcement to identify the vendor. If a Bitcoin wallet's private keys are lost, there is no way to recover the lost coins. Thieves cannot be identified when bitcoins are stolen. On the other hand, a major concern with a centralized digital currency is that an institution issuing such a currency is a single point of failure, in sharp contrast to a decentralized currency. This makes it easier for a malicious party to attack the centralized currency. Furthermore, with a centralized currency the inflation policy is subject to the whims of an individual institution. Any issuer of a centralized currency must, therefore, possess a large amount of public trust in order for the currency to be viable.

Most digital currency schemes (e.g., [CFN88], [SPC95], [BGK95], [LR98]) do not hide the value being transmitted or the balances in users' accounts.

Furthermore, law enforcement often views transactions involving large amounts of cash as inherently suspicious, regardless of whether there is any evidence of illegal activity.

Most of the e-cash schemes in the literature are built upon specific cryptographic assumptions such as discrete logarithm assumptions or the RSA assumption. (Two exceptions to this are [Cha82], which assumes a generic blind signature scheme, and [LMP96], which assumes generic encryption schemes.) Although schemes with revocable anonymity have been presented (e.g., [CPS96], [CMS97], [BGK95]), such schemes do not provide any incentive to preserve anonymity. In the protocols mentioned above, the entities that revoke anonymity are not involved with the transactions. Nevertheless, most digital currencies are either centralized, such as the protocol initially proposed by Chaum [Cha82], or completely distributed in a peer-to-peer fashion, such as Bitcoin [Nak08].

Thus, a continuing need exists for a digital currency system that uses generic secure multiparty computation (MPC) protocols to keep a secret-shared ledger among a group of servers and, in doing so, provides a semi-centralized digital currency scheme that allows regulations if enough of the servers collaborate.

SUMMARY OF INVENTION

Described is a system for operating a proactive digital currency (PDC) system. The system comprises an identity verification server (IVS) and a plurality of ledger servers. The IVS and ledger servers having memory with instructions encoded thereon, such that upon execution of the instructions, the IVS and ledger servers perform several operations, including transferring one or more coins from a first user to a second user, the one or more coins being a transaction value. Transferring of one or more coins from the first user to the second user further comprises operations of: receiving, at a plurality of collectively operated ledger servers, a first address of the first user, a second address of the second user, and a secret share of each bit in a binary representation of the transaction value, the secret share concealing the transaction amount, the first address and the second address each being a public key; verifying, by the ledger servers, that the transaction value will not overdraw a balance ledger associated with the first address of the first user, subtracting the transaction value and a transaction fee from the first address of the first user; and adding the transaction value to the second address of the second user.

In another aspect, the system performs operations of receiving, at an identity verification server (IVS), an identity of a first user; verifying, with the IVS, that the identity of the first user is an actual identity of a real person; and providing the first user a signature on the identity.

In yet another aspect, the system performs operations of receiving, at the plurality of ledger servers, an initialization request from the first user, the initialization request including a public key, a share of the identity of the first user, and a share of the IVS's signature on the identity, wherein the public key is an address of the first user, and invoking a signature verification protocol without revealing the identity of the first user, such that if the signature is determined to be valid, the address is added, by the ledger servers, to a balance ledger for the first user.

In another aspect, the system generates a private/public key pair for each user, the public key for each user being the address of the user.

In yet another aspect, the system performs an operation of determining the balance of an address, by receiving, at each ledger server, a balance request by a user, with each ledger server providing the user its share of the requested value(s).

In yet another aspect, the system performs an operation of causing each ledger server to periodically perform a proactive refresh protocol on all data that has been shared amongst the user's and ledger servers.

In another aspect, the system de-anonymizes a user by request of a regulator, by performing operations of: receiving at each ledger server evidence that an address is associated with illegal activity; determining, by each ledger server, if the evidence is indicative of a legal activity; if a predetermined threshold of ledger servers determine that the evidence is indicative of a legal activity, then causing each ledger server to transmit its share of the identity the user to the regulator.

In another aspect, the signature verification protocol is a multiparty computation (MPC) protocol, with the MPC protocol only being executed a single time per address.

Finally, the invention also includes a method and computer program product. The method comprises acts of causing one or more processors (e.g., servers) to perform the operations listed herein, while the computer program product is, for example, a non-transitory computer readable medium having instructions encoded thereon for causing the one or more processors to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
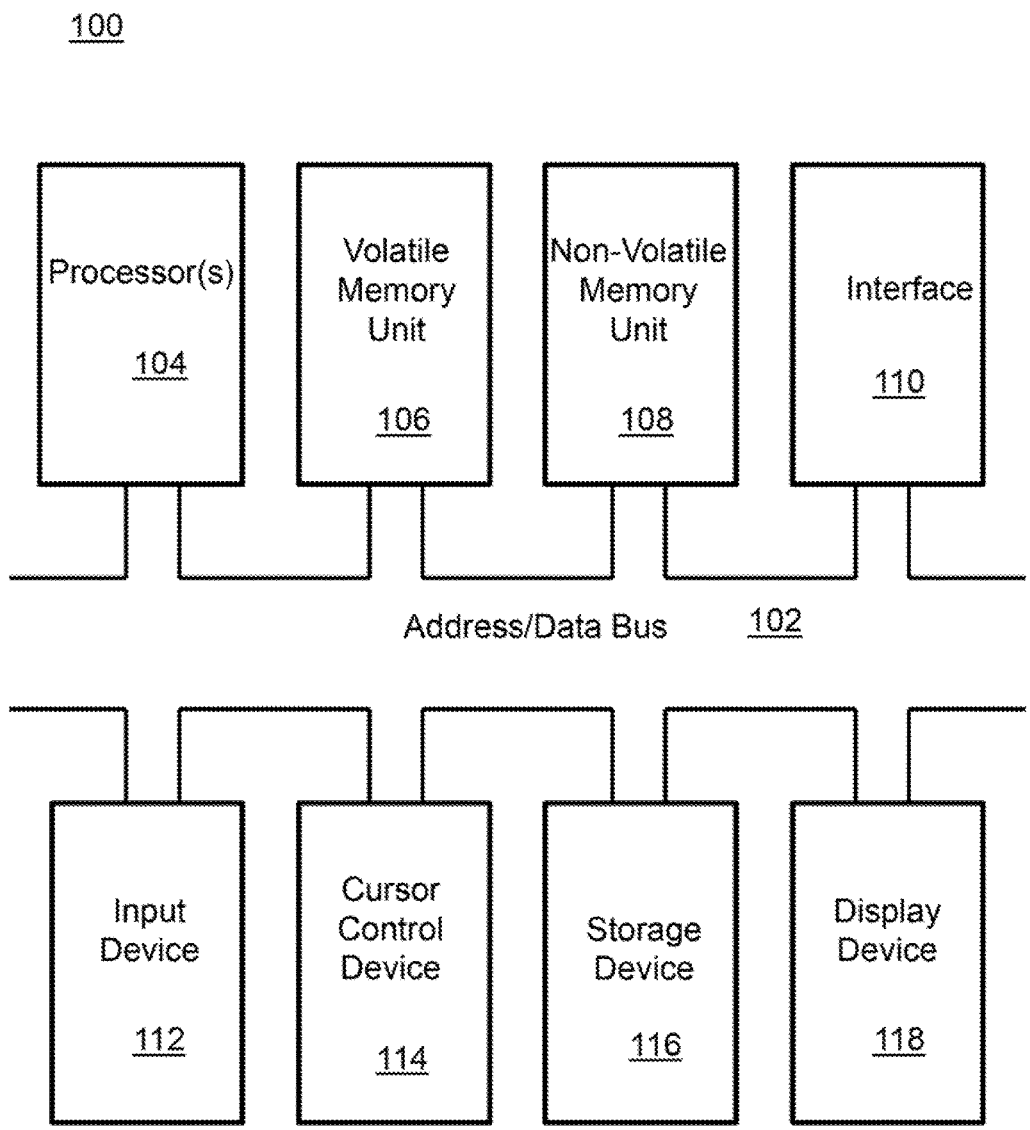
FIG. 1 is a block diagram depicting the components of a server according to the principles of the present invention.

The present invention relates to digital currency and, more particularly, to a digital currency system that uses generic secure multiparty computation (MPC) protocols to keep a secret-shared ledger among a group of servers to provide a semicentralized digital currency. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Following the glossary, a description of various principal aspects of the present invention is provided. Subsequently, an introduction provides the reader with a general understanding of the present invention. Next, specific aspects of the present invention are provided to give an understanding of the specific details.

1 LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding reference citation, as follows:

[BBSU12] Simon Barber, Xavier Boyen, Elaine Shi, and Ersin Uzun. Bitter to better—how to make bitcoin a better currency. In *Financial Cryptography*, pages 399-414, 2012.

[BCD+ 09] Peter Bogetoft, Dan Lund Christensen, Ivan DamgArd, Martin Geisler, Thomas P. Jakobsen, Mikkel Krøigaard, Janus Dam Nielsen, Jesper Buus Nielsen, Kurt Nielsen, Jakob Pagter, Michael I. Schwartzbach, and Tomas Toft. Secure multiparty computation goes live. In *Financial Cryptography*, pages 325-343, 2009.

[BELO13] Joshua Baron, Karim El Defrawy, Joshua Lampkins, and Rafail Ostrovsky. How to withstand mobile virus attacks, revisited. Cryptology ePrint Archive, Report 2013/529, 2013. http://eprint.iacr.org/.

[Ber84] Elwyn R. Berlekamp. *Algebraic Coding Theory*. Aegean Park Press, 1984.

[BGK95] Ernest F. Brickell, Peter Gemmell, and David W. Kravitz. Trusteebased tracing extensions to anonymous cash and the making of anonymous change. In *SODA*, pages 457-466, 1995.

[CFN88] David Chaum, Amos Fiat, and Moni Naor. Untraceable electronic cash. In *CRYPTO*, pages 319-327, 1988.

[Cha82] David Chaum. Blind signatures for untraceable payments. In *CRYPTO*, pages 199-203, 1982.

[CHL05] Jan Camenisch, Susan Hohenberger, and Anna Lysyanskaya. Compact e-cash. In Ronald Cramer, editor, *Advances in Cryptology EUROCRYPT* 2005, volume 3494 of *Lecture Notes in Computer Science*, pages 302-321. Springer Berlin Heidelberg, 2005.

[CHL06] Jan Camenisch, Susan Hohenberger, and Anna Lysyanskaya. Balancing accountability and privacy using e-cash (extended abstract). In Roberto Prisco and Moti Yung, editors, *Security and Cryptography for Networks*, volume 4116 of *Lecture Notes in Computer Science*, pages 141-155. Springer Berlin Heidelberg, 2006.

[CLM07] J. Camenisch, A. Lysyanskaya, and M. Meyerovich. Endorsed e-cash. In *Security and Privacy*, 2007. SP '07. IEEE Symposium on, pages 101-115, 2007.

[CMS97] Jan Camenisch, Ueli M. Maurer, and Markus Stadler. Digital payment systems with passive anonymity-revoking trustees. *Journal of Computer Security*, 5(1):69-90, 1997.

[CPS96] Jan Camenisch, Jean-Marc Piveteau, and Markus Stadler. An efficient fair payment system. In *ACM conference on Computer and Communications Security*, pages 88-94, 1996.

[DFK+06] Ivan DamgÅrd, Matthias Fitzi, Eike Kiltz, Jesper Buus Nielsen, and Tomas Toft. Unconditionally secure constant-rounds multi-party computation for equality, comparison, bits and exponentiation. In *TCC*, pages 285-304, 2006.

[DN07] Ivan Damgård and Jesper Buus Nielsen. Scalable and unconditionally secure multiparty computation. In *CRYPTO*, pages 572-590, 2007.

[FY92] Matthew K. Franklin and Moti Yung. Communication complexity of secure computation (extended abstract). In *STOC*, pages 699-710, 1992.

[HJKY95] Amir Herzberg, Stanislaw Jarecki, Hugo Krawczyk, and Moti Yung.
Proactive secret sharing or: How to cope with perpetual leakage. In *CRYPTO*, pages 339-352, 1995.

[KMTZ13] Jonathan Katz, Ueli Maurer, Bjorn Tackmann, and Vassilis Zikas. Universally composable synchronous computation. In *TCC*, pages 477-498, 2013.

[LMP96] Steven H. Low, Nicholas F. Maxemchuk, and Sanjoy Paul. Anonymous credit cards and their collusion analysis. *IEEE/ACM Trans. Netw.*, 4(6):809-816, 1996.

[LR98] Anna Lysyanskaya and Zulfikar Ramzan. Group blind digital signatures: A scalable solution to electronic cash. In *Financial Cryptography*, pages 184-197, 1998.

[McM13] Robert McMillan. $1.2 m hack shows why you should never store bitcoins on the internet, 2013. http://www.wired. comn/wiredenterprise/2013/11/inputs/.

[MPJ+ 13] Sarah Meiklejohn, Marjori Pomarole, Grant Jordan, Kirill Levchenko, Damon McCoy, Geoffrey M. Voelker, and Stefan Savage. A fistful of bitcoins: Characterizing payments among men with no names. *IMC*, 2013.

[Nak08] Satoshi Nakamoto. Bitcoin: A peer-to-peer electronic cash system, 2008. http://bitcoin.org/bitcoin.pdf.

[OY91] Rafail Ostrovsky and Moti Yung. How to withstand mobile virus attacks (extended abstract). In *PODC*, pages 51-59, 1991.

[Sch07] David Schultz. *Mobile Proactive Secret Sharing*. PhD thesis, Massachusetts Institute of Technology, 2007.

[Sha79] Adi Shamir. How to share a secret. *Commun. ACM*, 22(11):612-613, 1979.

[SPC95] Markus Stadler, Jean-Marc Piveteau, and Jan Camenisch. Fair blind signatures. In *EUROCRYPT*, pages 209-219, 1995.

2 PRINCIPAL ASPECTS

The present invention has three "principal" aspects. The first is a proactive digital currency (PDC) system. The PDC system is typically in the form of a computer system operating software or in the form of a "hard-coded" instruction set. This system may be incorporated into a wide variety of devices that provide different functionalities and, desirably, is incorporated across multiple servers and/or computers as will be described in further detail below. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a single server (i.e., computer system 100) as applicable to an aspect of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device, such as a voice command system or any other input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
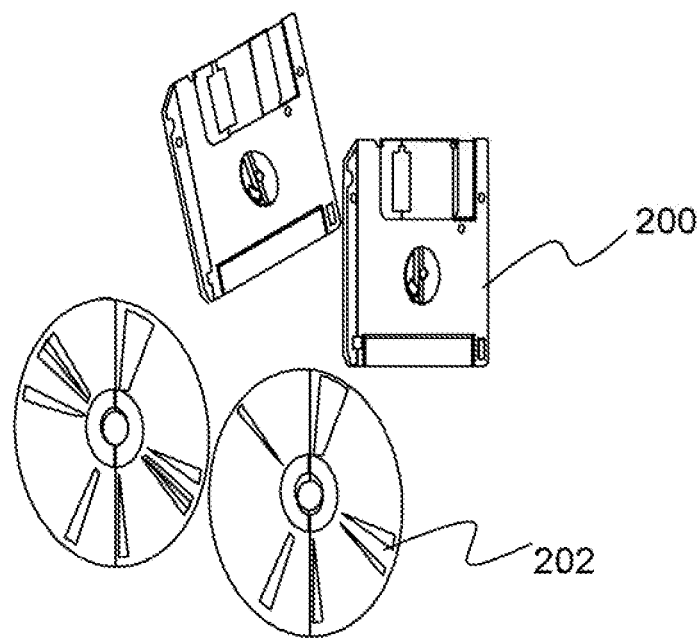
FIG. 2 is an illustration depicting a computer program product according to the principles of the present invention.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium.

3 INTRODUCTION

Described is a Proactive Digital Currency (PDC) system implementing a PDC scheme. The PDC scheme is a collection of cryptographic protocols that allow a group of Ledger Servers to implement a digital currency, storing a distributed ledger of balances and transactions. Thus, the system is a semi-centralized digital currency scheme that is controlled by a group of Ledger Servers, so that there is no single point of failure as in a centralized scheme.

The identities of users, balances stored at addresses, and transaction values are all distributed such that an adversary would have to corrupt some fixed (significant) fraction of the Ledger Servers in order to acquire any of that data. The distributed ledger is periodically proactively refreshed so that the adversary would have to corrupt the Ledger Servers between two consecutive refreshes in order to acquire data; data stolen before a proactive refresh cannot be combined with data stolen after a proactive refresh to reconstruct data.

Each address in the PDC system is linked to its owner's identity. Linking addresses to identities allows governments and/or law enforcement agencies to regulate the currency. Such regulation includes de-anonymizing and freezing suspect addresses, allowing users to retrieve lost coins, and implementing inflation. Alternatively, the PDC scheme can be implemented without linking identities to addresses, and the ledger can be stored such that it would be difficult for any entity to track the financial activities of users. Additionally, the system provides a protocol for converting secret sharings into batch sharings. This protocol is used in the construction of PDC, but is of independent interest outside the field of digital currency.

The PDC system hides both transmission values and balances (unless suspicious activity is reported) while still preventing overdrawing. If the values stored at addresses were known to an adversary, the adversary could then target users with a large number of coins and try to compromise their personal computers to steal such coins. Furthermore, law enforcement often views transactions involving large amounts of cash as inherently suspicious, regardless of whether there is any evidence of illegal activity; PDC eliminates the users' concern about such scrutiny.

The PDC system can used as a digital currency by a single government, or collection of governments or corporations to implement a secure, regulatable and privacy-preserving digital currency scheme or marketplace for performing different types of financial transactions or currency exchanges. For example, in addition to actual monetary currency, the system can also be used as a technique for issuing a corporate currency or corporate rewards points.

4 SPECIFIC ASPECTS OF THE INVENTION

For further understanding, described below is an overview of the PDC scheme which is followed by an outline of some cryptographic preliminaries. Thereafter, described below are details of maintaining the ledger, protocols required to perform individual operations required in financial transactions, protocols for regulation, and the main loop executed by the Ledger Servers.

4.1 Overview of the PDC Scheme

Most currency today exists in the form of a ledger. For example, when a person stores money in a bank account, the bank keeps a ledger indicating how much that person owns. In the case of decentralized schemes such as Bitcoin, the ledger is stored on multiple nodes and is distributed throughout the Internet. The main concept of the PDC scheme is to have a digital currency in which the ledger of balances and transactions is kept by a group of Ledger Servers. Apart from the Ledger Servers, there are users who own units of the currency, which are referred to as coins, and who may want to transmit coins to other users. It should be understood that although the term coins is used, the invention is not intended to be limited to a physical coin as the term is used only to illustrate a unit of currency (e.g., dollar(s), Euro(s), reward points, etc.) and that it can be applied to any type of currency. Each user may have multiple addresses, which are just public keys. The address serves the same purpose as an account number at a bank. To ensure that the identities of users can be traced if malicious activity occurs, an Identity Verification Server (IVS) will be used to facilitate linking identities to addresses with threshold-revocable anonymity.

Figure 3:
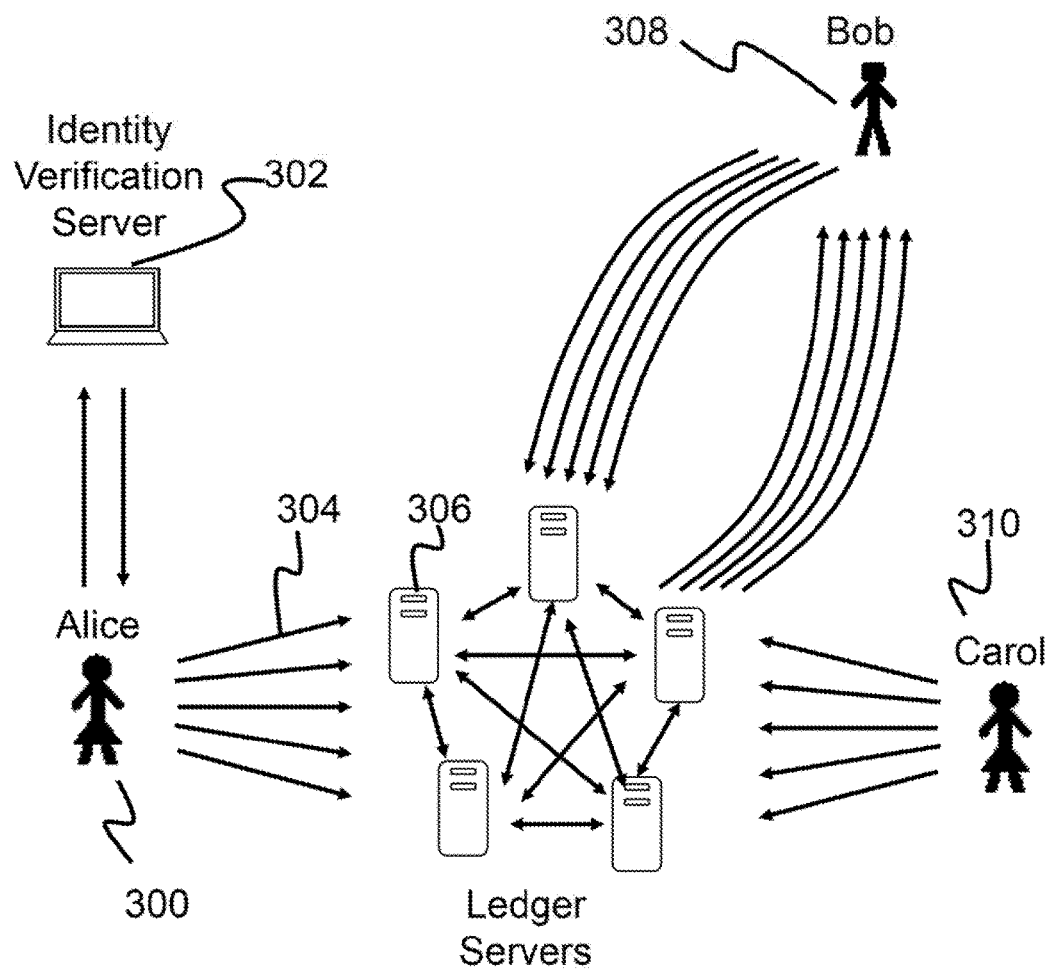
FIG. 3 is an illustration depicting an overview of the proactive digital currency system

As shown in FIG. 3, the PDC scheme operates as follows. When a first user 300 wants to create an address, the first user 300 provides her identity to an Identity Verification Server (IVS) 302. The IVS 302 checks that the provided identity is the identity of a real person who can be located and prosecuted if illegal activity is detected. A non-limiting example of such an identity verification process is that of Coinbase, which is a Bitcoin payment system. If the verification succeeds, the IVS 302 sends back to the first user 300 a signature on the identity. The first user 300 then generates a private/public key pair, with the public key serving as her address. The user sends 304 to each ledger server 306 a request to initialize an address; the request includes the public key that serves as the address, a share of the identity, and a share of the IVS's signature on the identity. The Ledger Servers 306 then invoke an MPC-based signature verification protocol without revealing the identity. Note that this MPC-based signature verification protocol is only executed once per address and does not have to work in real time. As discussed below in section 4.4.1, the user will want to introduce latency in the initialization process. If the signature is valid, the Ledger Servers 306 add the address, with zero balance, to the balance ledger. Details of initializing an address are given in section 4.4.1.

When the first user 300 wants to send coins to some address (e.g., a second user 308), she (i.e., the first user 300) sends to each Ledger Server 306 the sending address, the receiving address (of the second user 308), and a secret share of each bit in the binary representation of the transaction value. Thus, a plurality of collectively operated Ledger Servers 306 receive a first address of the first user 300, a second address of the second user 308, and the secret share. The secret share conceals the transaction amount, and each of the first address and the second address are a public key. Collectively operated refers to the plurality of Ledger Servers 306 being operated by one or more cooperating entities (such as users or other computer systems).

The Ledger servers 308 use an MPC-based comparison protocol to ensure that the first user 300 is not overdrawing the balance stored at the address; the comparison protocol does not reveal the value stored at the address or the value being transmitted. If the first user 300 is not overdrawing, the transaction value and a transaction fee (collected by the Ledger Servers 306) is subtracted from the sending address, and the transaction value is added to the receiving address (of the second user 308). The transactional data is then stored in the transaction ledger. Details of processing transactions are given in section 4.4.2.

When a user wants to check the balance of an address or view recent transactions to/from that address, the user sends a request to each of the Ledger Servers 306, and each replies with its share(s) of the requested value(s). Details of balance checks are given in section 4.4.3.

The ledger maintained by the Ledger Servers 306 contains highly sensitive financial data, so it is imperative to ensure secure, long-term storage of such data. To keep the ledger secure, the Ledger Servers 306 will periodically perform a proactive refresh protocol on all data that has been secret-shared. Details of proactive refresh are given in section 4.3.3.

If some regulator or law enforcement entity has evidence that an address is associated with illegal activity, the regulator can send this evidence to each of the Ledger Servers 306, and so long as more than a threshold number of the Ledger Servers 306 agree (e.g., three or more, or any predetermined number), they can de-anonymize the address by sending their shares of the associated identity to the regulator. The address may also be frozen pending legal action. In addition, the PDC system can implement retrieval of lost coins, elimination of "zombie coins," and inflation. Details of regulation are given in section 4.5.

As a brief summary and referring again to FIG. 3, a first user 300 (e.g., Alice) interacts with the IVS 302 and Ledger Servers 306 to initialize an address (see section 3.4.1 for details). A third user 310 (e.g., Carol) who wants to send coins to the second 308 (e.g., Bob), distributes shares of the binary representation of the value to be transmitted to the Ledger Servers 306 (see section 3.4.2 for details). The second user 308 (e.g., Bob) queries the Ledger Servers 306 to check the balance in his account (i.e., the second user's 308 account) and verify that the transfer from Carol (i.e., the third user 310) was processed (see section 3.4.3 for details). Note that the terms first, second and third are used for convenience purposes only to designate distinct user's. Further details regarding these processes are provided below.

4.2 Cryptographic Preliminaries

The parties involved in PDC are the n Ledger Servers $S_1, \ldots, S_n$, the Identity Verification Servers V, and the users; an individual user is denoted U. For the protocols used in this paper, the threshold of corruption for the Ledger Servers is $t<(\frac{1}{3}-\epsilon)n$ for some positive constant $\epsilon$. Operations occur over a finite field $\mathbb{Z}_p$ for some prime $p>2^{\gamma+\kappa}$, where $\gamma$ is the number of bits needed to represent the total amount of coins in circulation and $\kappa$ is a security parameter.

PDC uses both Shamir secret sharing [Sha79] and Franklin-Yung batch sharing [FY92]. To share a secret s, a party selects a degree t polynomial that is uniformly random subject to $f(0)=s$ and sends to each server $S_i$ the point $f(i)$. To batch-share a collection of secrets $s^{(1)}, \ldots, s^{(l)}$, a party selects a polynomial g of degree $d=l+t-1$ such that $g(-k)=s^{(k)}$ for $k=1, \ldots, l$ and $g(-l-k)$ is random for $k=1, \ldots, t$, and then sends to each server $S_i$ the point $g(i)$. The batch size l is set to n−3t. For both secret sharing and batch sharing, the BerlekampWelch algorithm [Ber84] is used to interpolate polynomials whenever interpolation is needed in the PDC scheme.

A public key signature and encryption scheme are assumed. The operations of signing and encrypting using key K are denoted $Sig_K$ and $Enc_K$. By abuse of notation, $Sig_V$ is written to denote signatures using party V's private key. Secure, authenticated channels are assumed between all parties, as well as an authenticated broadcast channel.

The PDC scheme requires the use of cryptographic protocols from the MPC literature. In particular, it requires a protocol for secret sharing (denoted Share), for generating secret sharings of random values (Random), for generating secret sharings of zero values (Zero), for multiplying shared values (Mult), for publicly opening sharings (Open), for proactively refreshing secret sharings (Refresh, see details in section 4.3.3), and for secure comparison (Compare). Except for secure comparison, protocols are required that can perform these operations with both secret sharings and batch sharings. The batch sharing versions of the protocols will be subscripted with B (i.e., the protocol for generating a batch sharing of all zeros is $Zero_B$). Any protocols that perform these tasks with secret sharings and batch sharings will work for PDC, so long as the corruption threshold for the protocols is not lower than t and the protocols are unconditionally secure. (By "unconditionally secure," it is meant that the protocols do not make any computational hardness assumptions.) In particular, it is possible to use the comparison protocol of [BCD+ 09], the proactive refresh protocol of [BELO13], and use [DN07] for the other protocols. There is no Zero protocol in [DN07], but the secret sharing protocol in [DN07] can be modified to do this. The protocols in [DN07] are for secret sharings, but they can easily be modified to work with batch sharings.

Note that many MPC protocols, including [DN07], use dispute resolution, keeping track of which servers are in conflict with one another during execution. Since a mobile adversary [(OY91] is assumed, disputes between parties may not last indefinitely; the set of disputes will be set to zero after each proactive refresh of the ledger.

4.3 Ledger Details
4.3.1 Overview of Ledger

The PDC scheme requires two ledgers maintained by the Ledger Servers. The first ledger keeps track of the balance in each address, and the second records the history of transactions; these are called the balance ledger and transaction ledger, respectively.

For the balance ledger, an individual entry for Ledger Server $S_i$ will be of the form (A, D(i), b(i), c), where A is the address, D(i) is a share of the identity associated with the address, b(i) is a share of the current balance stored in the address, and c is a counter that keeps track of how many transactions have been sent from address A (not counting transactions to A). The counter c is used when transferring coins to prevent double-spending attacks.

TABLE 1

List of Symbols

| Symbol | Description |
|---|---|
| U | User |
| V | Identity Verification Server |
| $S_i$ | Ledger Server i |
| R | Regulator; tracks malicious activity |
| n | Number of Ledger Servers |
| t | Ledger Server corruption threshold |
| l | Batch size for batched sharings |
| ε | Positive constant that determines the threshold and batch size |
| d | Degree of a batch sharing polynomial |
| init_addr | Identifier in header for address initialization messages |
| check_bal | Identifier in header for balance check messages |
| p | Large prime; modulus for field operations |
| γ | Number of bits needed to represent total number of coins in circulation |
| κ | Security parameter |
| $Enc_K(m)$ | Encryption of m with public key K |
| $Sig_K(m)$ | Signature on m with public key K |
| M | Upper bound on communication delay from user to Ledger Server |
| $Protocol_U$ | User part of Protocol |
| $Protocol_S$ | Ledger server part of Protocol |
| nonce | A nonce that includes a time-stamp and a κ-bit random number |
| tx | Identifier in header for transfer messages |
| ret_coins | Identifier in header for lost coin retrieval messages |

Entries in the transaction ledger will be stored in one of two formats. Initially, the transaction values will be shared among the Ledger Servers using normal secret sharing. Once the number of secret-shared ledger entries is at least l, groups of l secret sharings are converted into individual batch sharings of size l. Batch sharing reduces the amount of data the Ledger Servers need to store, and considerably reduces the cost of proactively refreshing the transaction ledger. Details of the conversion from secret sharings to batch sharings are given in section 4.3.3.

An individual secret-shared transaction ledger entry for Ledger Server $S_i$ will be of the form ($A_{from}$, $A_{to}$, c, B, s(i)), where $A_{from}$ is the sending address, $A_{to}$ is the receiving address, c is a counter indicating that this was the $c^{th}$ transaction from address $A_{from}$, B is the number of the block in which the transaction was processed, and s(i) is a share of the amount sent. An individual batch-shared transaction ledger entry for Ledger Server $S_i$ will be of the form ($\{(A_{from}^{(k)}, A_{to}^{(k)}, c^{(k)}, B^{(k)})\}_{k=1}^{l}$, s(i)), where ($A_{from}^{(k)}, A_{to}^{(k)}, c^{(k)}, B^{(k)}$) is the data corresponding to the transaction value stored in batch location k in the polynomial s.

4.3.2 Ledger Server Synchronization and Communication

Most existing secret sharing and MPC protocols assume a synchronous network setting. Real computer networks, such as the Internet, are asynchronous; synchronous protocols can work in an asynchronous setting assuming loosely synchronized clocks and bounded message delays, as shown in [KMTZ13]. Any institution operating a Ledger Server will (presumably) have ample technological resources to provide accurate clocks and bandwidth sufficient to ensure messages arrive in a timely manner. However, there is no way to guarantee even loose synchrony on the part of the clients that use PDC. To coordinate Ledger Servers with clients, data from clients will be collected into blocks. There is a fixed time interval, M, that defines the length of each block of data. Assuming the operation of the system begins at time zero, the data an individual Ledger Server receives between times 0 and M goes into the first block, and in general, the data received between times (T−1)·M and T·M goes into the $T^{th}$ block. Once the Ledger Servers finish collecting data for an individual block, they broadcast the contents of their block to all the other Ledger Servers.

If one of the Ledger Servers receives a secret share of some data, it will need to be sure that a sufficient number of the other servers have received shares of the same data before processing that data. So when the Ledger Servers broadcast their blocks of data, each will look at the blocks of the other Ledger Servers to determine if enough of the shares have been received by the servers. If enough shares have been received, the Ledger Servers will process the data in a synchronous fashion.

It is assumed that the delay for transmission from user to Ledger Server is less than M (which is assumed to be a couple of seconds). In the case that network latency or malicious intent causes the client's shares to arrive at different servers at different times, the delay may be enough that the shares are collected into the $T^{th}$ block for some servers and the $(T+1)^{th}$ block for other servers. To account for this possibility, messages will not be processed in the first block in which they are broadcast. Instead, they will be carried over into the next block and re-broadcast. Messages cannot be retained indefinitely, so no message is broadcast in more than 2 (consecutive) blocks for an individual Ledger Server. If a Ledger Server broadcasts a message in two consecutive blocks, and there are still not enough shares from the other Ledger Servers in the second block, the message is deleted.

Due to the lack of synchrony between the users and the Ledger Servers, each protocol that the user engages in with the Ledger Servers is broken into two protocols: a user part and a server part. When the user wants to perform some action, she runs the user protocol. The servers collect messages from users as a part of the main protocol, the Ledger_Server_Loop described in section 4.6. When the user's data is broadcast in a block, the servers then engage in the server part of the protocol. A subscript of U denotes the user part of the protocol and a subscript of S denotes the server part of the protocol. So for instance, when a user wants to initialize an address, the user runs Initialize_Address$_U$; once the Ledger Servers are ready to process the received data, they run Initialize_Address$_S$. The two protocols together are referred to as Initialize_Address.

4.3.3 Ensuring Long-term Confidentiality by Proactively Refreshing the Ledgers

The proactive security model was initially introduced in [OY91]. In standard multiparty computation protocols, it is assumed that an adversary can corrupt no more than a fixed fraction of the parties performing the computation. However, it may be more realistic to assume that a sophisticated adversary could eventually corrupt every party given a long enough period of time. In the proactive security model, the assumption is that the adversary can corrupt any number of parties, but can only corrupt a fixed fraction in any given time; such an adversary is called a mobile adversary in [OY91]. Since safeguarding the ledger of a digital currency is highly critical, it is appropriate to design the ledger to be secure in the proactive security model.

Protocols for proactively refreshing shared secrets proceed in two phases. In the first phase, a secret s shared with a polynomial P (such that P(0)=s) is updated by setting P←P+Q, where Q is a polynomial of the same degree as P which is random subject to the constraint that Q(0)=0. (If P is a batch sharing, then Q will be a sharing of a batch of all zeros.) Thus if an adversary learns no more than a threshold number of shares for the old P, this will give her no information about the secret when combined with shares of the new P, because the shares are independently distributed.

In the second phase, parties who had previously been corrupted and may have lost or corrupted data (either due to alteration of memory by malware or by a hard reboot to remove malware) recover the lost shares by interacting with the other parties.

There have been multiple proactive refresh schemes proposed [HJKY95, Sch07, BELO13]. The instantiation of PDC provided here uses the scheme from [BELO13], as it only assumes secure channels, whereas the other two schemes use the discrete logarithm assumption. Although in practice secure channels would be implemented with a public key infrastructure (PKI), it is preferable to assume only a generic PKI instead of discrete logarithm-based PKI.

The proactive refresh/recovery protocol from [BELO13] (called Block-Redistribute) uses a threshold of t<n/8 and a batch size of l≤n/4. This low threshold was required in order for the multiplication protocol to work, which required the use of degree 2d polynomials. The authors of [BELO13] use player virtualization could be implemented to raise their threshold to l<($\frac{1}{3}$-ϵ).

When refreshing the ledger the protocol from [BELO13] is utilized with a threshold of t<($\frac{1}{3}$-ϵ) and a batch size of l=n−3t, but player virtualization is not used, and it is not required that e be a power of two as in [BELO13]. Although the protocol in [BELO13] was designed for refreshing batch sharings, it can easily be modified to refresh secret sharings as well.

Recall that all entries in the transaction ledger are initially secret-shared. Before the description of how the Ledger Servers coordinate proactive refresh, first a protocol for converting secret sharings into batch sharings is given. Convert_Sharings draws on techniques from [BELO13], and is one of the contributions of this paper.

For this protocol, the notation [X] to denotes the set of integers from 1 to X. (Note that brackets [•] are not used to denote sharings as is standard in some MPC literature.) Thus the Cartesian product [X]×[Y] is {(x,y):1≤x≤X, 1≤y≤Y}. The protocol Convert_Sharings uses a set Corr to keep track of which parties may be corrupt. In step 10, when one party accuses another, the parties make a worst-case assumption that both parties are corrupt. Note that this set is distinct from any set of disputes which may be used in the MPC sub-protocols.

Convert_Sharings

Parties: $S_1, \ldots, S_n$.

Input: Each Ledger Server holds shares of the secret sharing polynomials $\{H_a^{(k)}\}_{(a,k) \in [l] \times [K]}$.

Output: Each Ledger Server holds shares of batch sharing polynomials $\{V^{(k)}\}_{k \in [K]}$ that contain the same secrets as did the $H_a^{(k)}$.

1. Set Corr=0.
2. The servers use Random to generate polynomials $H^{(K+1)}$ for a∈[l]. (These polynomials are used for masking and will be discarded later.)
3. Each $S_i$ selects polynomials $\{V_i^{(k)}\}_{k \in [K+1]}$ of degree ≤d such that $V_i^{(k)}(-a) = H_a^{(k)}(i)$ for all (a, k)∈[l]×[K+1] and shares them via Share$_B$.
4. The servers invoke Random K times to generate K sharings of random values $\{r^{(k)}\}_{k \in [K]}$.
5. The servers invoke Open K times to publicly reveal $\{r^{(k)}\}_{k \in [K]}$.
6. Define $\tilde{H}_a$ and $\tilde{V}_i$ for (a, i)∈[l]×[n] by $$\tilde{H}_a = \Sigma_{k=1}^{K} r^{(k)} H_a^{(k)} + H_a^{(K+1)}$$

and $$\tilde{V}_i = \Sigma_{k=1}^{K} r^{(k)} V_i^{(k)} + V_i^{(k+1)}.$$

Each server locally computes their shares of these polynomials.

7. Each server sends all their shares of $\tilde{H}_a$ and $\tilde{V}_i$ to each other server for each (a, i)∈[l]×[n]. (Note that this is not done using broadcast.)
8. Each server uses Berlekamp-Welch on the shares of $\tilde{V}_i$ received in the previous step to interpolate $\tilde{V}_i(-a)$ for each (a, i)∈[l]×[n].
9. Each server uses Berlekamp-Welch on the shares of $\tilde{H}_a$ to interpolate $\tilde{H}_a(i)$ for each (a, i)∈[l]×[n].
10. Each $S_j$ checks if $\tilde{V}_i(-a)=\tilde{H}_a(i)$ for each (a,i)∈[l]×[n]. If this does not hold for some $\tilde{V}_i$, then $S_j$ broadcasts ($S_j$, J'accuse, $S_i$). All servers add $S_i$ and $S_j$ to Corr. (After a server is added to Corr, any further accusations from that server are ignored.)
11. Each server erases all their shares of $\tilde{H}_a$ and $\tilde{V}_i$ and all shares of $H_a^{(K+1)}$ and $V_i^{(K+1)}$ for each (a, i)∈[l]×[n].
12. Define G to be the set of the first n−2t servers not in Corr. Let $\{z_1, \ldots, z_{n-2t}\}$ denote the set of indices of servers in G. Let $\lambda_i$ denote the Lagrange coefficients for interpolating the constant term of a degree-t shared secret from the shares of servers in G (i.e., for a polynomial f of degree ≤t, $f(0)=\lambda_1 f(z_1) + \ldots + \lambda_{n-2t} f(z_{n-2t})$).

Each Ledger Server locally computes its share of $V^{(k)} = \lambda_1 V_{z_1}^{(k)} + \ldots + \lambda_{n-2t} V_{z_{n-2t}}^{(k)}$ for each k∈[K].

To see that the interpolation in step 12 results in batch sharings of the (initially) secret-shared values, note that for each $(a, k) \in [l] \times [K]$, $$V^{(k)}(-a) = \lambda_1 V_{z_1}^{(k)}(-a) + \ldots + \lambda_{n-2t} V_{z_{n-2t}}^{(k)}(-a)$$

$$= \lambda_1 H_a^{(k)}(z_1) + \ldots + \lambda_{n-2t} H_a^{(k)}(z_{n-2t})$$

$$= H_a^{(k)}(0).$$

Thus $V^{(k)}$ is a batch sharing of the data that was initially secret-shared in the polynomials $H_a^{(k)}$ for $a \in [l]$.

The Convert_Sharings protocol is used in the Ledger_Serverloop (see section 4.6) to convert secret sharings to batch sharings as needed to conserve space. Below is the description of the protocol that the Ledger Servers use to proactively refresh their ledgers of secret sharings and batch sharings.

Refresh_Ledger
Parties: $S_1, \ldots, S_n$.
Input: Each Ledger Server uses all of its ledger entries as input.
Output: Each Ledger Server holds refreshed shares of the shared data in the ledger.
1. Each Ledger Server broadcasts a list of all addresses that they have stored in the balance ledger. Any address that broadcast by at least n−t of the servers is added to a list $S_A$ of addresses.
2. Each Ledger Server broadcasts a list of all transaction ledger entries whose sending and receiving addresses are in $S_A$ (although they do not broadcast their shares of the transaction values). Any transaction broadcast by at least n−t of the servers is added to a list $S_T$ of transactions.
3. For each address in $S_A$ and each secret-shared transaction in $S_T$, the Ledger Servers locally add the associated secret sharings into a list, $(f^{(1)}, \ldots, f^{(m_1)})$. Similarly, the batch-shared transactions are added into a list $(g^{(1)}, \ldots, g^{(m_2)})$.
4. The Ledger Servers invoke Refresh with $(f^{(1)}, \ldots, f^{(m_1)})$ as input and Refresh$_B$ with $(g^{(1)}, \ldots, g^{(m_2)})$ as input.
5. Each server adds its refreshed shares to the balance and transaction ledgers.

Since refreshing the ledger adds to the computational and communication cost of maintaining the system, the transaction ledger entries need not be retained indefinitely. They could be deleted after some fixed amount of time.

4.4 Accounting and Transaction Protocols

This section describes the protocols used to initialize addresses, transfer coins from one address to another, and to retrieve data from the ledger of balances and transactions.

4.4.1 Initializing an Address

The user, U, has an Identity Verification Server, V, verify that the user's ID is legitimate, the user generates a private key and corresponding address, then the ID is secret-shared among the Ledger Servers. This allows the Ledger Servers to de-anonymize an address if needed at some point in time.

Each message sent to the Ledger Servers will contain a nonce. The nonce will contain both a time-stamp (used to prevent replay attacks) and a K-bit random number.

Initialize_Address$_U$
Parties: U, V, $S_1, \ldots, S_n$.
Input: U's identifying information, ID.
Output: Signed messages $m_i$ (described in the last step) to each $S_i$.
1. U sends ID to V.
2. V verifies that ID is the identity of a real person. If so, V returns Sig$_V$(ID) to U. If not, V sends the message reject to U and the protocol terminates.
3. U generates a private key and corresponding public key A.
4. V generates polynomials f and g of degree t such that f(0)=ID and g(0)=Sig$_V$(ID) and sends $m_i$=(init_addr, nonce, A, V, f(i),g(i)) along with Sig$_A$ ($m_i$) to each $S_i$.

As discussed in section 4.3.2, after U runs Initialize_Address$_U$, the Ledger Servers collect the received data into blocks the Ledger_Server_Loop, and after broadcasting these blocks, they run Initialize_Address$_S$.

Initialize_Address$_S$
Parties: $S_1, \ldots, S_n$.
Input: A, V; at least n−t of the $S_i$ hold $v_i$, $w_i$.
Output: Each $S_i$ has a balance ledger entry for A.
1. The servers invoke Random twice to generate degree t polynomials $r_1$ and $r_2$, and each $S_i$ that had input $v_i$, $w_i$ broadcasts $v_i+r_1(i)$ and $w_i+r_2(i)$.
2. Each server performs the Berlekamp-Welch algorithm to determine if the values broadcast in the previous step lie on two degree t polynomials, and if so compute the constant terms. If the Berlekamp-Welch algorithm fails for either polynomial, the protocol terminates without initializing the address.
3. Let v denote the constant term interpolated from the $v_i+r_1(i)$, and let w denote the constant term interpolated from the $w_i+r_2(i)$. Each $S_i$ locally computes its share of f'(i)=v−$r_1$(i). This defines a new polynomial f' such that f'(0)=f(0)=ID, where f is the polynomial from Initialize_Address$_U$ (if U is honest). Similarly, the servers define and compute shares of g'(x)=w−$r_2$(x) such that g'(0)=g(0)= Sig$_V$(ID).
4. The servers run an MPC protocol for verifying that the value of Sig$_V$(ID) received from U is, in fact, a valid signature for ID. This is performed using f' and g' as inputs. If the signature is invalid, the protocol terminates.
5. The servers invoke Zero to generate a polynomial b, and each $S_i$ adds (A, f'(i), b(i), 0) to the balance ledger.

Note that for an individual user, the first two steps of Initialize_Address$_U$ need only be performed once. The remaining steps can be repeated each time U wants to create a new address, as long as U retains a copy of Sig$_V$(ID).

The purpose of secret sharing the identity of the user is to preserve anonymity. If the steps above are executed one after another without any latency, there is the possibility of an adversary de-anonymizing a user. Namely, if the IVS and just one of the Ledger Servers are corrupt, and if the adversary sees an init_addr request occurring immediately after the signature Sig$_V$(ID) is sent to U, then the adversary can reasonably guess that address A is associated with the identity ID. To remedy this, U can introduce some arbitrarily long delay (hours or days) after step 2 of Initialize_Address$_U$.

The use of an MPC protocol to verify a secret-shared signature for a secret-shared identity is likely the slowest part of the protocol, but note that this process need only be performed once for each address. The complexity of the protocol will vary depending on which public key scheme is being used. Protocols from [DFK$^+$ 06] for modular arithmetic on secret-shared values can be used for implementing that step.

4.4.2 Transfer

To transfer coins from one address to another, the sender secret-shares the amount to be transferred, the Ledger Servers use a secure comparison protocol to check that the sender is not overdrawing the address, and then the amount is subtracted from the sender's balance and added to the recipient's balance. However, it is also necessary to verify that the amount being transferred falls into the proper range;

namely, it must be less than $2^\gamma$. Therefore, instead of the sender secret sharing the value as a single field element, the sender will secret-share each of the $\gamma$ bits of the value separately.

The transfer protocol must prevent replay attacks in which the adversary resends the transfer request, thereby moving more coins out of the sender's address than anticipated. Therefore, the (signed) transaction will contain a counter; the counter will be set to j for the $j^{th}$ transaction out of the address. If the user forgets the value of the counter, she can perform a balance check (described later).

The Ledger Servers are allowed to collect a transaction fee, z, for each transaction. The fee is a fixed value. Collecting transaction fees is not a necessary part of the system, but presumably the Ledger Servers would want to be compensated for their work. In addition, this provides an economic incentive for the Ledger Servers to keep the ledger accurately. For simplicity, it is assumed that there is a single address, X, to which all fees are sent, although one could easily modify the protocol to divide the fees among the Ledger Servers.

Transfer$_U$
Parties: U, $S_1, \ldots, S_n$.
Input: Sending address $A_1$, receiving address $A_2$, and transfer value, s.
Output: Signed messages $m_i$ (described in the last step) to each $S_i$.
1. U decomposes s into its binary representation, $(s^{(\gamma-1)}, \ldots, s^{(0)}) \in \mathbb{Z}_p^\gamma$, where $s^{(\gamma-1)}$ is the most significant bit and $s^{(0)}$ is the least significant bit.
2. U constructs $\gamma$ degree t polynomials $f^{(\gamma-1)}, \ldots, f^{(0)}$ such that $f^{(k)}(0) = s^{(k)}$ for each $k=0, \ldots, \gamma-1$.
3. U sends $m_i = (tx, nonce, A_1, A_2, j, (f^{(\gamma-1)}(i), \ldots, f^{(0)}(i)))$ and $Sig_{A_1}(m_i)$ to each $S_i$.

After receiving the requests to transfer coins from the user, the Ledger Servers run their portion of the protocol.

Transfer$_S$
Parties: $S_1, \ldots, S_n$.
Input: $A_1, A_2, j$; at least n–t of the $S_i$ hold $(v_i^{(\gamma-1)}, \ldots, v_i^{(0)})$.
Output: Each Ledger Server has a new entry in the transaction ledger; additionally, the balance ledger entries for $A_1$ and $A_2$ are updated to reflect the transaction.
1. The Ledger Servers invoke Random $\gamma$ times to generate polynomials $(r^{(\gamma-1)}, \ldots, r^{(0)})$, and each $S_i$ that had input $(v_i^{(\gamma-1)}, \ldots, v_i^{(0)})$ broadcasts $v_i^{(k)} + r^{(k)}(i)$ for each $k=0, \ldots, \gamma-1$.
2. Each server performs the Berlekamp-Welch algorithm to determine if the values broadcast in the previous step lie on $\gamma$ degree t polynomials, and if so compute the constant terms. If the Berlekamp-Welch algorithm fails for any polynomial, the protocol terminates without transferring the coins.
3. Let $C^{(k)}$ denote the constant term interpolated from the $v_i^{(k)} + r^{(k)}(i)$. Each $S_i$ locally computes its share of $g^{(k)}(i) = C^{(k)} - r^{(k)}(i)$ for each $k=0, \ldots, \gamma-1$. This defines new polynomials $g^{(k)}$ such that $g^{(k)}(0) = f^{(k)}(0) = s^{(k)}$, where the $f^{(k)}$ are the polynomials from Transfer$_U$ (if U is honest).
4. The servers invoke Zero $\gamma$ times to generate polynomials $\{\mu^{(k)}\}_{k=0}^{\gamma-1}$, invoke Mult to generate a sharing of $(g^{(k)} + \mu^{(k)} - 1)g^{(k)}$, and invoke Open on the sharing of the product for each $k=0, \ldots, \gamma-1$. If any of the opened values is not zero, the protocol terminates.
5. Each server locally computes its share $s(i) = \Sigma_{k=0}^{\gamma-1} 2^k g^{(k)}(i)$ of the degree t polynomial s.
6. Let $b_1$ and $b_2$ denote the polynomials stored in the balance ledger that represent the balances in the addresses $A_1$ and $A_2$ (respectively). The servers invoke Compare to verify that $b_1(0) \geq z + s(0)$. If this does not hold, the protocol terminates.
7. The servers locally update their shares of the balances in addresses $A_1$ and $A_2$ as follows: $b_1(i) \leftarrow b_1(i) - s(i) - z$ and $b_2(i) \leftarrow b_2(i) + s(i)$.
8. Each server locally updates the balance ledger entry for the address X, incrementing its share by z.
9. Each server locally increments the transaction counter in the balance ledger for address $A_1$ by one.
10. Each $S_i$ adds the entry $(A_1, A_2, j, B, s(i))$ to the transaction ledger.

4.4.3 Balance Checks and Transaction Confirmations

The user sends a request for the data, and each Ledger Server sends its copy of the transaction "meta-data" (addresses, counter numbers, and block numbers) as well as shares of the required values. As far as secret sharings are concerned, this is relatively simple: Each Ledger Server sends the share as-is. For batch-shared transactions, some computation by the Ledger Servers is required before sending shares.

Suppose that U has requested some transactional data that is stored in a batch with other users' data. If U's requested data is stored in locations $k_1, k_2, \ldots, k_m$ within the batch, the Ledger Servers construct a canonical sharing of a batch with ones in locations $k_1, k_2, \ldots, k_m$ and zeros elsewhere. The phrase "canonical sharing" means a polynomial g such that $g(-k_j)=1$ for each $j=1, \ldots, m$ and $g(-k)=0$ for all other $k=1, \ldots, t+1$. Since a canonical sharing for a known set $\{k_1, k_2, \ldots, k_m\}$ is completely deterministic, the Ledger Servers can compute their shares locally without any interaction. This sharing is then added to a random sharing of a batch of all zeros for privacy reasons. The Ledger Servers invoke Mult$_B$ to multiply this sum by the batch sharing in the transaction ledger. The shares of the resultant product are then sent to the user.

The user looks up transactions that she authorized by the counter number of the transaction. However, she has no way to know what the counter number for transactions she receives will be. Therefore, she looks them up by block number, which is equivalent to looking them up by the time at which the coins were received.

Check_Balance$_U$
Parties: U, $S_1, \ldots, S_n$.
Input: Address A, for which U holds the private key.
Output: U holds values of the requested ledger entries.
1. If U wants to view some transactions with A as the sending address, then U sets $j_1$ to be the earliest transaction counter value requested and $j_2$ to be the latest. Otherwise, U sets $j_1 = j_2 = \bot$. If U wants to view some transactions with A as the receiving address, then U sets $B_1$ to be the earliest block number requested and $B_2$ to be the latest. Otherwise, U sets $B_1 = B_2 = \bot$.
2. U sends $m=(\text{check\_bal}, \text{nonce}, A, j_1, j_2, B_1, B_2)$ along with $Sig_A(m)$ to each server $S_i$.
3. U waits some pre-determined amount of time for the Ledger Servers to respond. Upon receiving shares of the requested data, U uses the Berlekamp-Welch algorithm to reconstruct the shared data.

After receiving the balance check requests from the user in the main loop, the Ledger Servers run their portion of the protocol.

Check_Balance$_S$
Parties: U, $S_1, \ldots, S_n$.
Input: $A, j_1, j_2, B_1, B_2$.
Output: Requested ledger entries are sent to U.
1. Each server looks for the entry for address A in the balance ledger, all entries in the transaction ledger with A as the sending address with counter values between $j_1$ and $j_2$, and all entries in the transaction ledger with A as the receiving address with block numbers between $B_1$ and $B_2$. (If $j_1$ or $j_2$ equals $\perp$, then the server assumes that U does not want information on transactions sent from A, and similarly for $B_1$, $B_2$.)

2. If some of the data requested is batch-shared, then let $f^{(1)}, \ldots, f^{(d)}$ denote all the batch sharings that contain requested data, and perform the following steps:

2.1 Let $K^{(j)} = \{k_1^{(j)}, \ldots, k_{m_j}^{(j)}\}$ denote the locations in batch $f^{(j)}$ that correspond to U's data, and let $g^{(j)}$ denote the canonical sharing of the batch with ones in locations $K_{(j)}$ and zeros elsewhere.

2.2 The servers invoke $\text{Zero}_B$ d times to generate polynomials $r^{(1)}, \ldots, r^{(d)}$ and locally compute their shares of $h^{(j)} = g^{(j)} + r^{(j)}$ for each $j=1, \ldots, d$.

2.3 The servers invoke $\text{Mult}_B$ to multiply each pair $(f^{(j)}, h^{(j)})$, resulting in sharings $s^{(j)}$ for $j=1, \ldots, d$.

3. The servers send their shares of all the requested secret sharings to U, along with their shares of each $s^{(j)}$ if any batch-shared data was requested. Additionally, the servers send U the associated transaction meta-data and the current transaction counter in the balance ledger entry for A.

4.5 Regulation Protocols

One of the advantages of secret sharing the identity of the users is to prevent accidental or malicious loss of coins. This is a considerable problem with deployed schemes such as Bitcoin as they exist today. There have been several bitcoin thefts, in one case totaling $1.2 million [McM13]. Even though the addresses to which the stolen coins are sent are often public knowledge, there is no means by which to return the coins to the victim or at least freeze the suspect address until the issue is resolved [MPJ+ 13]. Bitcoin users often loose their private keys, and hence their coins. Furthermore, there are many coins visible on the Bitcoin blockchain, called "zombie coins" in [BBSU12], which do not appear to be in use, either due to the loss of private keys, or because the amount was so small that the user did not care to remember the private keys (essentially throwing the coins away). Each of the above problems can be addressed in PDC. Solutions to these problems are briefly described in this section, and monetary inflation is briefly addressed.

4.5.1 Address Freezing and De-Anonymization

Suppose that some regulator, R, such as a law enforcement agency, has reason to believe that a particular address, A, is associated with illegal activity. So long as more than 2t Ledger Servers agree that the address is suspect, the secret-shared identity can be revealed, and the Ledger Servers can refuse to process further transactions from/to that address. This provides some level of privacy guarantee to the user, in that the user knows her address cannot be de-anonymized unless there is some consensus.

The protocol Freeze allows address freezing and de-anonymization. It is assumed that any address that is de-anonymized will also be frozen, although these two actions could easily be split into two different protocols.

Freeze
Parties: R, $S_1, \ldots, S_n$.
Input: Regulator R has some evidence, E, that and address, A, is involved in some illegal activities.
Output: R holds the identity of the user associated with address A.

1. R sends $m = (\text{freeze}, \text{nonce}, A, E)$ and $\text{Sig}_R(m)$ to each Ledger Server.
2. Each Ledger Server that receives a properly signed message of the form (freeze, nonce, A, E) examines the evidence and determines whether or not the address should be frozen and de-anonymized.
3. Each Ledger Server that decides that address A is suspect looks up its share D(i) of the address owner's identity in the balance ledger and sends D(i) to R.
4. If R received more than 2t shares in the previous step, R uses the Berlekamp-Welch algorithm to interpolate the identity D(0) of the user associated with address A.
5. Each Ledger Server that decides that address A is suspect will ignore any further transaction requests that send coins to or from that address.

4.5.2 Lost Coin Retrieval

Since the private key associated with an address is used to sign all messages sent to the Ledger Servers, loosing the private key is tantamount to loosing the coins stored in the address, as the coins can no longer be accessed. Loss of private keys has been a persistent problem for Bitcoin users, as there is no way to retrieve such lost coins. Because the user's identity is linked to the address in PDC, one can retrieve lost coins. The protocol is briefly described, and then the full specification is given.

Suppose the user has lost the private key for address L and wants to send the coins in L to a new address A. She constructs a degree t polynomial Q that is uniformly random subject to the constraint that Q(0)=ID, where ID is her identity. The user sends (ret_coins, nonce, L, A, Q(i)) to $S_i$ for each $i=1, \ldots, n$.

The Ledger Servers subtract the sharing Q provided by the user from the sharing of the identity in the balance ledger entry for L. This sharing is then multiplied by a random number, and the product is publicly opened. If the opened value is zero, this means that the identity provided by the user is the same as the secret-shared identity stored in the balance ledger, so the Ledger Servers transfer the coins in L to A as requested.

$\text{Retrieve\_Coins}_U$
Parties: U, $S_1, \ldots, S_n$.
Input: U has inputs L, A, and ID, where L is an address for which U has lost the private key, A is an address for which U has not lost the private key, and ID is U's identity.
Output: Signed messages $m_i$ (described in the last step) to each $S_i$.

1. U constructs a degree t polynomial Q such that Q(0)=ID.
2. U sends $m_i = (\text{ret\_coins}, \text{nonce}, L, A, Q(i))$ along with $\text{Sig}_A(m_i)$ to each $S_i$.

$\text{Retrieve-Coins}_S$
Parties: $S_1, \ldots, S_n$.
Input: L, A; at least n−t of the $S_i$ hold $Q_i$.
Output: Each Ledger Server has a new entry in the transaction ledger; additionally, the balance ledger entries for L and A are updated to reflect the transaction.

1. The Ledger Servers invoke Random to generate a polynomial r, and each $S_i$ that had input $Q_i$ broadcasts $r(i) + Q_i$.
2. Each Ledger Server performs the Berlekamp-Welch algorithm to determine if the values broadcast in the previous step lie on a degree t polynomial, and if so compute the constant term. If the Berlekamp-Welch algorithm fails, the protocol terminates without transferring the coins.
3. Let Q denote the constant term interpolated from the $Q_i + r(i)$ in the previous step. Each $S_i$ locally computes its share of $Q'(i) = Q - r(i)$. This defines a new polynomial Q' such that $Q'(0) = Q(0) = ID$, where Q is the polynomial from $\text{Retrieve\_Coins}_U$ (if U is honest).
4. Let $b_L$ and $b_A$ denote the polynomials stored in the balance ledger that represent the balances in the addresses L and A (respectively). The servers invoke Compare to verify that $b_L(0) \geq z$. If this does not hold, the protocol terminates.

5. Let D denote the polynomial stored in the balance ledger that shares the identity associated with address L. The Ledger Servers invoke Random to generate a polynomial R, invoke Mult to construct a sharing of (D−Q′)·R, and then invoke Open on this sharing. If the opened values is not zero, the protocol terminates.
6. The servers locally update their shares of the balance in address A as follows: $b_A(i) \leftarrow b_A(i) + b_L(i) - z$.
7. Each server locally updates the balance ledger entry for the address X, incrementing its share by z.
8. Each server erases the balance ledger for address L.
9. Each server $S_i$ adds the entry $(L, A, 0, B, b_L(i)-z)$ to the transaction ledger, where the 0 is a special value indicating that this was a lost coin transfer.

4.5.3 Zombie Coin Release

If a user ever loses coins and does not retrieve them using the protocol in section 4.5.2, this can present a problem for the operation of the system. The Ledger Servers must continue to store data associated to that address and must periodically refresh the secret-shared data; this adds to the computation and communication cost of maintaining the system. To solve this issue, the Ledger Servers may agree upon some fixed amount of time and assume that if there has been no activity with an address for that amount of time, then it is appropriate to de-anonymize the address and contact the user. The details of implementation are beyond the scope of this paper.

4.5.4 Inflation

Compared to schemes such as Bitcoin, PDC can easily implement inflation. In PDC, as long as at least n−t of the Ledger Servers agree to add coins to the balance ledger, any number of coins can be created at any time. The specifics of how to best implement inflation from an economic perspective are beyond the scope of this paper.

The Bitcoin network generates new coins approximately every ten minutes, with a decreasing rate of inflation. The protocol dictates that the inflation rate will eventually go down to zero, so that the total number of bitcoins in circulation will never be more than 21 million. It has been suggested that Bitcoin may suffer from a deflationary spiral, causing economic collapse [BBSU12].

4.6 Ledger Server Loop

The main protocol run by the Ledger Servers continues in an indefinite loop, since it is assumed that the currency will exist for a long time. The core of the PDC scheme is the collection of data into blocks and the broadcasting of those blocks to the other servers. Different actions are taken according to what is found in those blocks. The servers are loosely synchronized so as to broadcast their blocks at approximately the same time. These points in time are referred to as broadcast points. The block broadcast by server $S_i$ at broadcast point T is referred to as $B_i^{(T)}$.

Each message received by the Ledger Servers consists of a header and a collection of shares (although the collection of shares may be empty). These parts are denoted [header] and [shares], respectively. Each header contains a nonce, and each nonce contains a time-stamp. Recall from section 4.3.2 that the Ledger Servers assume that the delay for transmission from the user is less than M. A time-stamp is considered out of date if it varies from the Ledger Server's clock by at least M.

Ledger_Server_Loop

Ledger Server $S_i$ performs the following steps:
1. Set T=1.
2. Set $B_i^{(T)}=$. If T≥2, add all messages in $B_i^{(T-1)}$ that were not in $B_i^{(T-2)}$ to $B_i^{(T)}$.
3. Collect all properly formed and signed messages received from users, adding them to the set $B_i^{(T)}$ as they are received. Messages that are out of date, messages that are duplicates of messages already in $B_i^{(T)}$, and tx messages with incorrect transaction counters are deleted. (Duplicates are defined to be messages with the same nonce, init_addr messages with the same address, or tx messages with the same sending address.)
4. When the broadcast point T is reached (at time TM), broadcast the headers of all messages in $B_i^{(T)}$.
5. If some [header] is broadcast by at least n−t Ledger Servers, and if this is the second broadcast containing messages with that header, then one of steps 6 through 9 is performed:
6. If [header]=(init_addr, nonce, A, V), and if the address A does not already exist in the balance ledger, then run Initialize_Address$_S$ with A, V as public input and $S_i$ using the [shares]=$(v_i, w_i)$ portion of its message as input.
7. If [header]=(tx, nonce, $A_1, A_2$, j), and if the addresses $A_1$, $A_2$ already exist in the balance ledger, then run Transfer$_S$ with $A_1, A_2$, j as public input and $S_i$ using the [shares]= $(v_i^{(\gamma-1)}, \ldots, v_i^{(0)})$ portion of its message as input.
8. If [header]=(check_bal, nonce, A, $j_1, j_2, B_1, B_2$), and if the address A already exists in the balance ledger, then run Check_Balance$_S$ with A, $j_1, j_2, B_1, B_2$ as input. (Here, [shares]=.)
9. If [header]=(ret_coins, nonce, L, A), and if the addresses L and A already exist in the balance ledger, then run Retrieve_Coins$_S$ with L and A as public input and $S_i$ using the [shares]=$Q_i$ portion of its message as input.
10. If there are m≥l secret sharings in the transaction ledger, the Ledger Servers run Convert_Sharings on the first $\lfloor m/l \rfloor l$ of these sharings.
11. Set T←T+1.
12. Jump to step 2.

Note that the protocol for refreshing the ledger has not been added to the main loop. It could either be added between steps 11 and 12 in the main loop, or the Ledger Servers could run a separate loop in parallel with the main loop, constantly refreshing shared data.

4.7 Increasing Anonymity Guarantees

PDC can be made strictly anonymous, without the user ever revealing her identity to anyone. The Identity Verification Server can be eliminated entirely, and the addition of an address to the balance ledger can be performed in essentially the same way as Bitcoin: The user generates a private key and corresponding public key as an address, and the Ledger Servers add this address to the balance ledger the first time that a user sends value to it.

To protect against seizure of data, the transaction ledger can be encrypted. Two copies of each transaction will be stored in the transaction ledger, one for the sending address, $A_1$, and one for the receiving address, $A_2$. The copy for $A_i$ is encrypted using the address A, as a public key so that not even the Ledger Servers can decrypt it. This prevents the user from requesting transaction records by counter number or block number; instead, the Ledger Servers will number all entries (both sending and receiving) sequentially as they are processed, and the user will ask the Ledger Servers to send transaction ledger entries with numbers within some range. Since it is assumed that a public key infrastructure exists, each Ledger Server will have a public/private key pair and will encrypt its signature on the transaction ledger entry along with the entry itself. These signatures can be retrieved during Check_Balance and used as proof of payment.

Encrypting the transaction ledger prevents the Ledger Servers from batch sharing and proactively refreshing the transactional data (although the balance ledger will still be proactively refreshed). This means that a computationally powerful mobile adversary could slowly infiltrate the Ledger Servers one-by-one, decrypt the ledger entries, and reconstruct the transaction value. To remedy this problem, the Check_Balance protocol is altered to give the user the option of instructing the Ledger Servers to delete the retrieved data. Thus the responsibility of long-term data storage is shifted from the Ledger Servers to the user.

What is claimed is:

1. A method for operating a proactive digital currency (PDC) ledger, the method comprising acts of:
    transferring one or more coins from a first user to a second user, the one or more coins being a transaction value, wherein transferring of one or more coins from the first user to the second user further comprises operations of:
        receiving, at an identity verification server (IVS), an identity of the first user;
        verifying, with the IVS, that the identity of the first user is an actual identity of a real person;
        providing the first user a signature on the identity;
        receiving, at a plurality of collectively operated ledger servers, an initialization request from the first user, the initialization request including a public key, a share of the identity of the first user, and a share of the IVS's signature on the identity, wherein the public key is a first address of the first user; and
        invoking a signature verification protocol without revealing the identity of the first user, such that if the signature is determined to be valid, the first address of the first user is added, by the plurality of collectively operated ledger servers, to a balance ledger for the first user, wherein the signature verification protocol is a secure multiparty computation (MPC) protocol;
    receiving, at the plurality of collectively operated ledger servers, the first address of the first user, a second address of the second user, and a secret share of each bit in a binary representation of the transaction value, the secret share concealing the transaction value, the first address and the second address each being a public key;
    verifying, by the plurality of collectively operated ledger servers, that the transaction value will not overdraw the balance ledger associated with the first address of the first user;
    subtracting the transaction value and a transaction fee from the first address of the first user; and
    adding the transaction value to the second address of the second user.

2. The method as set forth in claim 1, further comprising an operation of generating a private/public key pair for each user, the public key for each user being the address of the user.

3. The method as set forth in claim 2, further comprising an act of determining the balance of the second address by receiving, at the plurality of collectively operated ledger servers a balance request by the second user with each ledger server providing the user its share of the requested value(s).

4. The method as set forth in claim 3, further comprising an act of causing each ledger server to periodically perform a proactive refresh protocol on all data that has been shared amongst the user's and ledger servers.

5. The method as set forth in claim 4, further comprising an act of de-anonymizing a user by request of a regulator, by performing acts of:
    receiving at each ledger server evidence that an address is associated with illegal activity;
    determining, by each ledger server, if the evidence is indicative of a legal activity; and
    if a predetermined threshold of ledger servers determine that the evidence is indicative of a legal activity, then causing each ledger server to transmit its share of the identity of the user to the regulator.

6. The method as set forth in claim 5, wherein the secure MPC protocol is only executed a single time per address.

7. A ledger for a proactive digital currency (PDC), the ledger comprising:
    a plurality of collectively operated ledger servers, the plurality of collectively operated ledger servers having memory with instructions encoded thereon, such that upon execution of the instructions, the system transfers one or more coins from a first user to a second user, the one or more coins being a transaction value, wherein transferring of one or more coins from the first user to the second user further comprises operations of:
        receiving, at an identity verification server (IVS), an identity of the first user;
        verifying, with the IVS, that the identity of the first user is an actual identity of a real person;
        providing the first user a signature on the identity;
        receiving, at the plurality of collectively operated ledger servers, an initialization request from the first user, the initialization request including a public key, a share of the identity of the first user, and a share of the IVS's signature on the identity, wherein the public key is a first address of the first user; and
        invoking a signature verification protocol without revealing the identity of the first user, such that if the signature is determined to be valid, the first address of the user is added, by the plurality of collectively operated ledger servers, to a balance ledger for the first user, wherein the signature verification protocol is a secure multiparty computation (MPC) protocol;
    receiving, at the plurality of collectively operated ledger servers, the first address of the first user, a second address of the second user, and a secret share of each bit in a binary representation of the transaction value, the secret share concealing the transaction value, the first address and the second address each being a public key;
    verifying, by the plurality of collectively operated ledger servers, that the transaction value will not overdraw the balance ledger associated with the first address of the first user;
    subtracting the transaction value and a transaction fee from the first address of the first user; and
    adding the transaction value to the second address of the second user.

8. The ledger as set forth in claim 7, further comprising an operation of generating a private/public key pair for each user, the public key for each user being the address of the user.

9. The ledger as set forth in claim 8, further comprising an operation of determining the balance of the second address by receiving, at the plurality of collectively operated ledger servers a balance request by the second user with each ledger server providing the user its share of the requested value(s).

10. The ledger as set forth in claim 9, further comprising an operation of causing each ledger server to periodically perform a proactive refresh protocol on all data that has been shared amongst the user's and ledger servers.

11. The ledger as set forth in claim 10, further comprising an operation of de-anonymizing a user by request of a regulator, by performing operations of:

receiving at each ledger server evidence that an address is associated with illegal activity;

determining, by each ledger server, if the evidence is indicative of a legal activity; and if a predetermined threshold of ledger servers determine that the evidence is indicative of a legal activity, then causing each ledger server to transmit its share of the identity of the user to the regulator.

12. The ledger as set forth in claim 11, wherein the secure MPC protocol is only executed a single time per address.

13. A computer program product implementing a proactive digital currency (PDC) ledger, the computer program product comprising:

a non-transitory computer-readable medium having executable instructions encoded thereon, such that upon execution of the instructions by one or more processors, the one or more processors perform an operation of transferring one or more coins from a first user to a second user, the one or more coins being a transaction value, wherein transferring of one or more coins from the first user to the second user further comprises operations of:

receiving, at an identity verification server (IVS), an identity of the first user;

verifying, with the IVS, that the identity of the first user is an actual identity of a real person;

providing the first user a signature on the identity;

receiving, at a plurality of collectively operated ledger servers, an initialization request from the first user, the initialization request including a public key, a share of the identity of the first user, and a share of the IVS's signature on the identity, wherein the public key is a first address of the first user; and invoking a signature verification protocol without revealing the identity of the first user, such that if the signature is determined to be valid, the first address of the first user is added, by the plurality of collectively operated ledger servers, to a balance ledger for the first user, wherein the signature verification protocol is a secure multiparty computation (MPC) protocol;

receiving, at the plurality of collectively operated ledger servers, the first address of the first user, a second address of the second user, and a secret share of each bit in a binary representation of the transaction value, the secret share concealing the transaction value, the first address and the second address each being a public key;

verifying, by the plurality of collectively operated ledger servers, that the transaction value will not overdraw a balance ledger associated with the first address of the first user;

subtracting the transaction value and a transaction fee from the first address of the first user; and adding the transaction value to the second address of the second user.

14. The computer program product as set forth in claim 13, further comprising an operation of generating a private/public key pair for each user, the public key for each user being the address of the user.

15. The computer program product as set forth in claim 14, further comprising an operation of determining the balance of the second address by receiving, at the plurality of collectively operated ledger servers a balance request by the second user with each ledger server providing the user its share of the requested value(s).

16. The computer program product as set forth in claim 15, further comprising an operation of causing each ledger server to periodically perform a proactive refresh protocol on all data that has been shared amongst the user's and ledger servers.

17. The computer program product as set forth in claim 16, further comprising an operation of de-anonymizing a user by request of a regulator, by performing acts of:

receiving at each ledger server evidence that an address is associated with illegal activity;

determining, by each ledger server, if the evidence is indicative of a legal activity; and if a predetermined threshold of ledger servers determine that the evidence is indicative of a legal activity, then causing each ledger server to transmit its share of the identity of the user to the regulator.

18. The computer program product as set forth in claim 17, wherein the secure MPC protocol is only executed a single time per address.

19. The system as set forth in claim 1, further comprising a lost coin protocol.

* * * * *